United States Patent
Riese et al.

(10) Patent No.: US 11,318,991 B2
(45) Date of Patent: May 3, 2022

(54) METHOD FOR CONTROLLING A WHEEL STEERING ANGLE OF AT LEAST ONE VEHICLE WHEEL OF A VEHICLE

(71) Applicant: Robert Bosch GmbH, Stuttgart (DE)

(72) Inventors: Christian Riese, Stuttgart (DE); Joachim Zanker, Oggelshausen (DE); Matthias Ehrmann, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/979,946

(22) PCT Filed: Jan. 30, 2019

(86) PCT No.: PCT/EP2019/052231
§ 371 (c)(1),
(2) Date: Sep. 11, 2020

(87) PCT Pub. No.: WO2019/174807
PCT Pub. Date: Sep. 19, 2019

(65) Prior Publication Data
US 2021/0016830 A1   Jan. 21, 2021

(30) Foreign Application Priority Data
Mar. 16, 2018   (DE) ...................... 10 2018 204 081.8

(51) Int. Cl.
*B62D 6/00* (2006.01)
*B62D 15/02* (2006.01)
*B62D 5/00* (2006.01)

(52) U.S. Cl.
CPC ......... *B62D 15/0285* (2013.01); *B62D 5/006* (2013.01); *B62D 6/002* (2013.01); *B62D 6/008* (2013.01); *B62D 15/021* (2013.01)

(58) Field of Classification Search
CPC .. G05D 1/0212; G05D 1/0011; G05D 1/0297; G05D 2201/0216; B66F 9/00;
(Continued)

(56) References Cited

U.S. PATENT DOCUMENTS

2008/0190687 A1*   8/2008   Shirakawa ............. B62D 6/002
                                                                180/444
2012/0072067 A1*   3/2012   Jecker ................ B62D 15/0285
                                                                701/25
(Continued)

FOREIGN PATENT DOCUMENTS

JP         2008189105 A       8/2008

OTHER PUBLICATIONS

International Search Report corresponding to PCT Application No. PCT/EP2019/052231, dated Apr. 24, 2019 (German and English language document) (5 pages).

*Primary Examiner* — Shardul D Patel
(74) *Attorney, Agent, or Firm* — Maginot, Moore & Beck LLP

(57) ABSTRACT

A method is for controlling a wheel steering angle of at least one vehicle wheel of a vehicle, in particular of a motor vehicle. The vehicle has a steer-by-wire steering system including at least one wheel steering angle control element, which is provided at least for modifying the wheel steering angle of the vehicle wheel according to a steering demand. In at least one operating mode, in which the vehicle is at a standstill and a steering demand is received, the wheel steering angle of the vehicle wheel is at least substantially maintained at a constant value and a desired wheel steering angle for the vehicle wheel is determined in accordance with the steering demand. In at least one subsequent additional operating mode, in which the vehicle is moving, the wheel
(Continued)

steering angle is adjusted to the desired wheel steering angle by the wheel steering angle control element.

11 Claims, 2 Drawing Sheets

(58) Field of Classification Search
CPC ........... G08G 1/00; H04B 7/04; H04W 84/02; B62D 6/00
USPC .......................................................... 701/41
See application file for complete search history.

(56) References Cited

U.S. PATENT DOCUMENTS

| | | | |
|---|---|---|---|
| 2013/0190983 A1* | 7/2013 | Tatsukawa | B62D 6/00 701/41 |
| 2017/0247053 A1* | 8/2017 | Lavoie | B62D 1/04 |

* cited by examiner

METHOD FOR CONTROLLING A WHEEL STEERING ANGLE OF AT LEAST ONE VEHICLE WHEEL OF A VEHICLE

This application is a 35 U.S.C. § 371 National Stage Application of PCT/EP2019/052231, filed on Jan. 30, 2019, which claims the benefit of priority to Serial No. DE 10 2018 204 081.8, filed on Mar. 16, 2018 in Germany, the disclosures of which are incorporated herein by reference in their entirety.

The disclosure relates to a method for controlling a wheel steering angle of at least one vehicle wheel of a vehicle.

In addition, the disclosure relates to a vehicle as well as a control unit.

BACKGROUND

From the prior art, vehicles with steer-by-wire steering systems are known, which do not have a direct mechanical connection between a steering input element, such as a steering wheel, and steered vehicle wheels, and in which a steering demand is exclusively electrically forwarded to the steering input element. To change a wheel steering angle of a vehicle wheel, the steer-by-wire steering systems include at least one wheel steering angle controller electrically connected to the steering input element.

In addition, it is known that the highest steering torques typically occur while steering at a standstill, since the mechanics of the front axle have to work against the standing vehicle wheel in this case. This leads on the one hand to a greatly increased power requirement and on the other hand to a high component load, which in particular causes the mechanics of the front axle, such as a wheel steering angle controller and/or a steering gear, as well as the vehicle wheels to be heavily loaded and also to wear out faster.

The object of the disclosure consists in particular in providing a method for controlling a steering angle with improved characteristics in terms of steering behavior.

SUMMARY

The disclosure is based on a method for controlling a wheel steering angle of at least one vehicle wheel of a vehicle, in particular a motor vehicle, wherein the wheel is in particular steerable and preferably in the form of a front wheel, in particular to avoid a wheel steering angle change of the vehicle wheel when the vehicle is at a standstill, wherein the vehicle has a steer-by-wire steering system with at least one steering angle controller, which is provided at least for changing the wheel steering angle of the vehicle wheel as a function of a steering demand.

It is proposed that in at least one operating state in which the vehicle is at a standstill, in particular with a vehicle speed of zero, and a steering demand is received, the wheel steering angle of the vehicle wheel is at least substantially kept constant and a target wheel steering angle for the vehicle wheel is determined depending on the steering demand, and wherein in at least one further operating state following the operating state, in particular in time, in which the vehicle is moving, in particular at a non-zero vehicle speed not equal to zero, the wheel steering angle is adjusted to the target wheel steering angle by means of the wheel steering angle controller. In particular, the wheel steering angle is controlled in the further operating state in such a way that the wheel steering angle changes and in particular so that the wheel steering angle and the target wheel steering angle match. An "at least substantially constant wheel steering angle" is understood in particular to mean a wheel steering angle at which slight adjustments of the wheel steering angle of the vehicle wheel are still possible, for example to prevent running into a curb or the like. In principle, however, the wheel steering angle of the vehicle wheel can also be kept completely constant, so that no change of the wheel steering angle takes place in the operating state. By this embodiment, in particular, a steering behavior can be improved, in particular during a steering process when the vehicle is at a standstill, wherein particularly advantageously a wheel steering angle change of the vehicle wheel when the vehicle is at a standstill can be completely avoided. Furthermore, a power requirement and/or a component load can be advantageously reduced, in particular of the wheel steering angle controller. In addition, efficiency can be optimized advantageously, in particular steering efficiency, performance efficiency, component efficiency, space efficiency and/or cost efficiency.

In this context, a "wheel steering angle controller" shall be understood in particular to mean a unit which has an operative connection to at least one vehicle wheel and in particular which is mechanically separated from a steering input unit of the steer-by-wire steering system, which is provided to transmit a steering demand to the vehicle wheels by changing a wheel steering angle of at least one vehicle wheel and thereby advantageously to control at least an orientation of the vehicle wheel and/or to influence a direction of travel of the vehicle. For this purpose, the wheel steering angle controller advantageously comprises at least one steering control element, for example in the form of a rack, and at least one steering actuator, for example in the form of an electric motor, operatively connected to the steering control element. Furthermore, the wheel steering angle controller may in particular be in the form of a single wheel controller and assigned to exactly one vehicle wheel, preferably in the form of a front wheel, or may be in the form of a central controller and be assigned to at least two vehicle wheels, preferably two front wheels.

In the present case, the vehicle and/or the steer-by-wire steering system may further comprise in particular at least one computing unit and/or at least one control unit with a computing unit, wherein the computing unit is provided in particular to perform the method for controlling the wheel steering angle of at least one vehicle wheel. In this context, a "computing unit" is to be understood in particular to mean an electrical and/or electronic unit, which has an information input, information processing and an information output. Advantageously, the computing unit further has at least one processor, at least one operating memory, at least one input and/or output means, at least one operating program, at least one control routine, at least one regulating routine and/or at least one calculation routine. In particular, the computing unit is provided, when in at least one operating state in which the vehicle is at a standstill, in particular with a vehicle speed of zero, and a steering demand is received, to maintain the steering angle of the vehicle wheel at least substantially constant and to determine a target wheel steering angle for the vehicle wheel as a function of the steering demand, and in at least one further operating state following the operating state, in particular in time, in which the vehicle is moving, in particular at a non-zero vehicle speed, to adjust the wheel steering angle to the target wheel steering angle by actuating a steering angle controller. The method is particularly advantageously provided for in particular synchronous or individual control of at least two wheel steering angles of at least two vehicle wheels of a vehicle, preferably in the form of front wheels. In particular, "provided" shall be understood to mean specially programmed, designed and/or equipped. That an object is provided for a particular function should be understood in particular to mean that the object fulfills and/or executes this particular function in at least one application state and/or operating state.

According to a particularly advantageous development of the disclosure, it is proposed that the wheel steering angle is adjusted to the target wheel steering angle by means of the wheel steering angle controller as soon as the vehicle starts to move. Preferably, the wheel steering angle is changed no later than 1 s, preferably no later than 0.5 s and more preferably no later than 0.2 s, after starting the vehicle rolling and/or at the latest when reaching a vehicle speed of 3 km/h and preferably at the latest when reaching a vehicle speed of 1 km/h. In this way, in particular an advantageously fast adjustment of the wheel steering angle can be achieved in the further operating state in which the vehicle is moving, and/or a steering demand can be implemented advantageously precisely and/or inconspicuously for a driver.

It is also advantageously suggested that in the operating state a target trajectory correlated with the steering demand is determined for a vehicle driving process, in particular a planned and/or estimated process, in particular a start-up process, a maneuvering process and/or a parking process, and the target wheel steering angle is determined depending on the target trajectory. Advantageously, the computing unit may comprise at least one planning function with a planning routine and may be provided to determine the target trajectory for the driving process correlated with the steering demand by means of the planning routine. Preferably, the target wheel steering angle is determined depending on the target trajectory in such a way that a change of the wheel steering angle of the vehicle wheel when the vehicle is at a standstill is completely avoided. By avoiding a wheel steering angle change of the vehicle wheel when the vehicle is at a standstill, in particular a steering actuator, for example in the form of an electric motor, of the wheel steering angle controller can be of smaller dimensions, whereby in particular costs can be reduced and weight and/or installation space can be saved.

In addition, it is proposed that the steer-by-wire steering system has at least one steering input unit, in particular purely electrically connected to the wheel steering angle controller, with at least one steering input element, for example in the form of a steering wheel, for manual input of a steering demand. In this case, the steering demand is used in particular for a manual change of the wheel steering angle, whereby manual control of the vehicle can be advantageously achieved.

It is also preferably proposed that the steering input unit should comprise a steering input actuator at least for generating a steering resistance and/or a restoring torque on the steering input element, wherein in the operating state a realistic steering feel is simulated by means of the steering input actuator and in particular is transmitted to the steering input element. A "steering input actuator" is to be understood to mean in particular an electrical and/or electronic unit, advantageously in the form of an electric motor, in particular different from the wheel steering angle controller and preferably with a direct mechanical connection to the steering input element, which is provided to detect signals, forces and/or torques from the steering input element, in particular directly, and/or to transmit these to the steering input element, in particular directly, and thereby at least to adjust a steering feel perceptible by a driver via the steering input element and/or to provide the driver with haptic feedback from the ground and/or the vehicle wheels via the steering input element. This allows a driver to be provided with an advantageously realistic and particularly expected steering feel.

According to a further embodiment of the disclosure, it is proposed that a steering demand for changing the wheel steering angle in at least one application state and/or in at least one operating mode of the vehicle is provided by an autonomously operating assistance function and in particular without manual input from a driver at the steering input element. Preferably, the computing unit has the assistance function for the autonomous provision of the steering demand. In this way, a wheel steering angle change of the vehicle wheel when the vehicle is at a standstill can be avoided, in particular also during autonomous driving processes.

According to a particularly preferred embodiment of the disclosure, it is proposed to that the assistance function is in the form of a parking assistant, wherein in the operating state a target trajectory correlated with the steering demand is determined for an entire parking process of the vehicle, in particular a planned and/or estimated process, and the target wheel steering angle is determined in such a way as to avoid a change in the steering angle of the vehicle wheel when the vehicle is at a standstill during the entire parking process. In particular, the parking process comprises at least two and/or at least three parking movements. In particular, a particularly efficient and component-friendly parking process can be achieved by this means.

It is also preferably proposed that in the determination of the target wheel steering angle, in particular in addition to the steering demand, at least one sensor system parameter of a vehicle sensor system is taken into account. In particular, in this case the vehicle and/or the steer-by-wire steering system may include the vehicle sensor system, which is provided in particular for determination of the sensor system parameter. The vehicle sensor system may in particular comprise at least one vehicle sensor, such as a vehicle speed sensor, a steering angle sensor, a torque sensor, a yaw rate sensor, an accelerometer sensor and/or a transverse acceleration sensor or the like, for detecting at least one operating parameter of the vehicle itself and/or at least one environment sensor, such as a radar sensor, a lidar sensor, a sound sensor and/or a camera sensor or the like, for detecting at least one vehicle environmental parameter. Particularly advantageously, the vehicle sensor system can also be used for simulating a realistic steering feel by means of the steering input actuator. In this way, in particular, a particularly reliable and/or accurate determination of the target wheel steering angle can be achieved. In addition, the operational safety can be advantageously increased and potential accidents can be prevented, for example when driving against a curb and/or another object.

Particularly high operational safety can be achieved in particular if in the determination of the target wheel steering angle, in particular in addition to the steering demand, at least one driver's input is taken into account, in particular a manual steering demand, in particular from a driver's input unit, such as the actuation of an accelerator pedal and/or a brake pedal. In particular, the vehicle and/or the steer-by-wire steering system may include the driver's input unit in this case.

The method for controlling the wheel steering angle should not be limited to the application and embodiment described above. In particular, the method for controlling the wheel steering angle may have a different number of elements, components, and units from that specified herein to fulfil a functionality described herein.

BRIEF DESCRIPTION OF THE DRAWINGS

Other advantages are given in the following description of the drawings. An exemplary embodiment of the disclosure is shown in the drawings. The drawings, description and claims contain numerous features in combination. The person skilled in the art will also consider the features individually and combine them into meaningful further combinations.

In the figures.

DETAILED DESCRIPTION

Figure 1A:
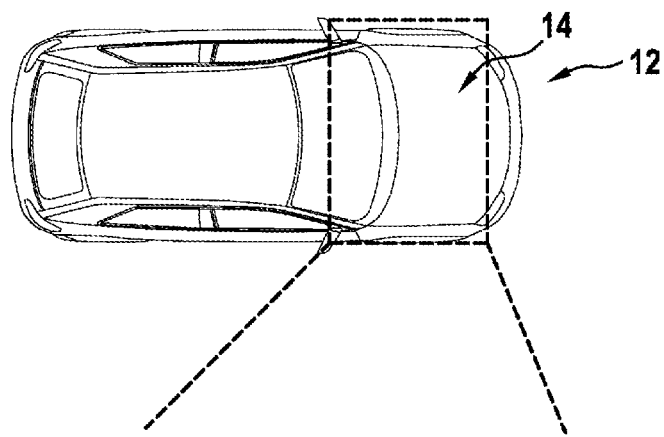
FIG. 1a-b show a vehicle with a steer-by-wire steering system in a simplified representation.
Figure 1B:
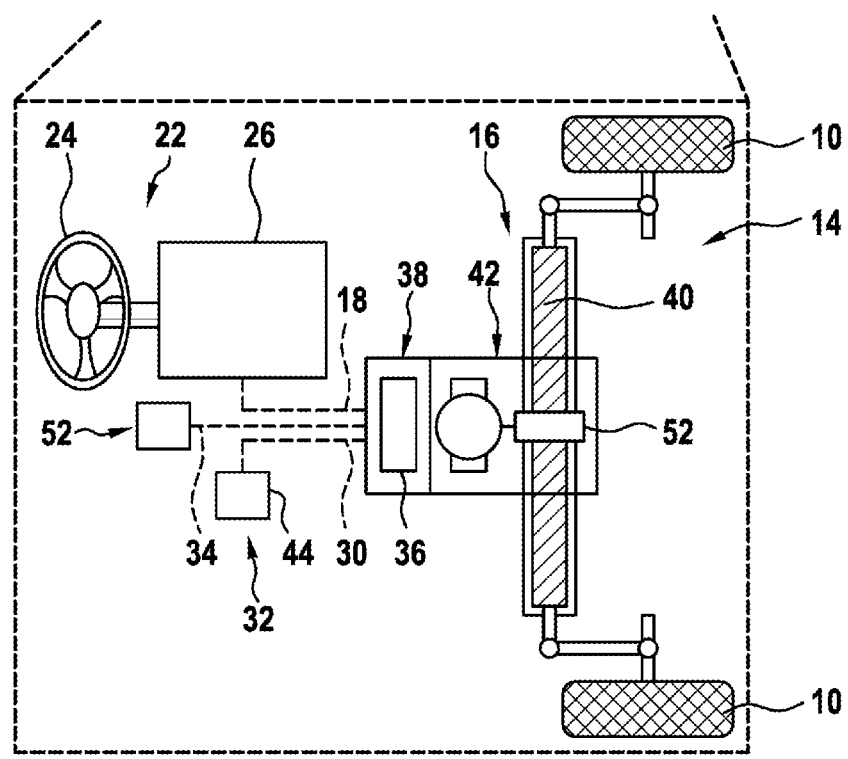

FIGS. 1a and 1b show a vehicle 12 by way of example in the form of a motor vehicle with multiple vehicle wheels and with a steer-by-wire steering system 14 in a schematic representation. The steer-by-wire steering system 14 has an operative connection to the vehicle wheels 10 and is provided to influence a direction of travel of the vehicle 12, wherein in at least one operating state a steering demand 18, 19 is forwarded exclusively electrically to the vehicle wheels 10.

The steer-by-wire steering system 14 comprises at least one wheel steering angle controller 16, which in the present case is also referred to as the "steering rack actuator". The wheel steering angle controller 16 is by way of example designed as a central controller and has an operative connection to at least two vehicle wheels 10, in particular two front wheels. The wheel steering angle controller 16 is provided at least for adjustment of a wheel steering angle of the vehicle wheels 10 as a function of a steering demand 18, 19. In the present case, the wheel steering angle controller 16 is provided to cause a swivel movement and/or rotational movement of the vehicle wheels 10 and in particular to implement the steering demand 18, 19 as a steering movement of the vehicle wheels 10.

For this purpose, the wheel steering angle controller 16 comprises a steering control element 40, which in the present case is in the form of a rack by way of example, and at least one steering actuator 42 operatively connected to the steering control element 40, wherein the actuator is in particular in the form of an electric motor, in the present case by way of example as a permanently excited synchronous motor. In principle, however, a steering device could also comprise multiple wheel steering angle controllers, for example in the form of single wheel controllers, wherein each of the wheel steering angle controllers is assigned exactly one vehicle wheel, preferably in the form of a front wheel.

The steer-by-wire steering system 14 also has a steering input unit 22. The steering input unit 22 is connected purely electrically to the wheel steering angle controller 16. The steering input unit 22 comprises at least one steering input element 24 for manual input of a steering demand 18, for example in the form of a steering wheel. In addition, the steering input unit 22 comprises a steering input actuator 26, which is also referred to as the "steering wheel actuator". The steering input actuator 26 is mechanically connected to the steering input element 24. The steering input actuator 26 is in the form of an electric motor in the present case. The steering input actuator 26 is provided to detect signals, forces and/or torques from the steering input element 24, in particular directly, and/or to transmit these to the steering input element 24, in particular directly. In the present case, the steering input actuator 26 is provided at least for generating a steering resistance and/or a restoring torque on the steering input element 24. In addition, the steering input actuator 26 is provided to adjust a steering feel that can be detected by a driver via the steering input element 24. Alternatively, a steering input element could also be in the form of a steering lever and/or a steering ball or the like. Also, a steer-by-wire steering system could in principle have no steering input unit, for example in a purely autonomous vehicle.

The vehicle 12 also comprises a vehicle sensor system 32. The vehicle sensor system 32 is provided for the determination of at least one sensor system parameter 30. For this purpose, the vehicle sensor system 32 can comprise at least one sensor 44 and advantageously a variety of different sensors 44. At least one of the sensors 44 may be, for example, in the form of a vehicle sensor for detecting at least one operating parameter of the vehicle 12 itself and/or of an environment sensor for detecting at least one environmental parameter of the vehicle 12. In this context, the sensors 44 may be, for example, in the form of a vehicle speed sensor, a steering angle sensor, a torque sensor, a yaw rate sensor, an accelerometer sensor, a transverse acceleration sensor, a radar sensor, a sound sensor and/or a camera sensor or the like.

In addition, the vehicle 12 comprises a driver's input unit 52, for example in the form of an accelerator pedal and/or a brake pedal. The driver's input unit 52 is provided for the manual entry of a driver's input 34, which differs from a steering demand 18, 19. The driver's input 34 may correspond to an actuation of the accelerator pedal and/or the brake pedal, for example.

In addition, the vehicle 12 has a control unit 38. The control unit 38 is by way of example in the form of a steering control unit and is therefore part of the steer-by-wire steering system 14. The control unit 38 is assigned to the wheel steering angle controller 16 and in particular is directly coupled to the steering actuator 42. The control unit 38 and the steering actuator 42 form a common assembly, a so-called "power pack". The control unit 38 also has an operative connection to the steering input unit 22, to the vehicle sensor system 32 and to the driver's input unit 52. The control unit 38 is provided for the control of the wheel steering angle controller 16 and in particular the steering actuator 42, at least depending on a steering demand 18, 19.

For this purpose, the control unit 38 comprises a computing unit 36. The computing unit 36 comprises at least one processor (not shown), for example in the form of a microprocessor, and at least one operating memory (not shown). In addition, the computing unit 36 comprises at least one operating program stored in the operating memory with at least one calculation routine, at least one control routine, at least one regulating routine and at least one planning routine. In principle, however, it is also conceivable to design a control unit separately from a steering actuator. In this context, for example, a control unit can also be assigned to a steering input unit. In addition, a steer-by-wire steering system and/or a vehicle could also have a single central control unit with a central computing unit. Furthermore, an operating program could also be stored in another operating memory of the vehicle.

In certain situations, such as a parking process, a maneuvering process and/or a start-up process, it may now happen that even with the vehicle 12 at a standstill a wheel steering angle of the vehicle wheels 10 is to be changed, for example due to a manual steering demand 18 at the steering input element 24 by a driver of the vehicle 12. Such steering with the vehicle 12 at a standstill, however, highly loads a steering mechanism, in particular the wheel steering angle controller 16, as well as the vehicle wheels 10 and at the same time leads to a greatly increased power requirement. In order to achieve a change in the steering angle when the vehicle 12 is at a standstill, relatively large steering actuators are required that are oversized compared to the other requirements during operation. This leads to higher costs, larger and heavier steering actuators, and higher energy expenditure, so that steering when the vehicle 12 is at a standstill should be avoided if possible.

Figure 2:
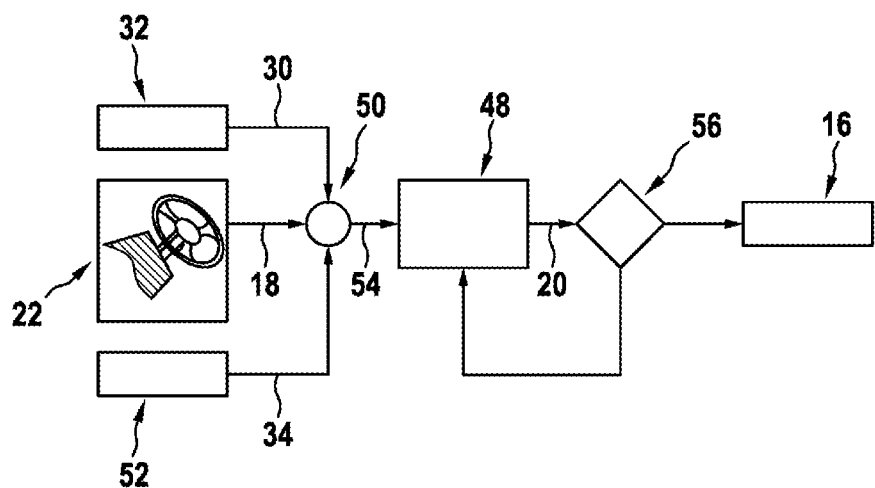
FIG. 2 shows a schematic representation of a signal flow diagram for control of a wheel steering angle of at least one vehicle wheel of the vehicle and FIG. 3 shows a schematic representation of a further signal flow diagram for controlling a wheel steering angle of at least one vehicle wheel of the vehicle.
Figure 3:
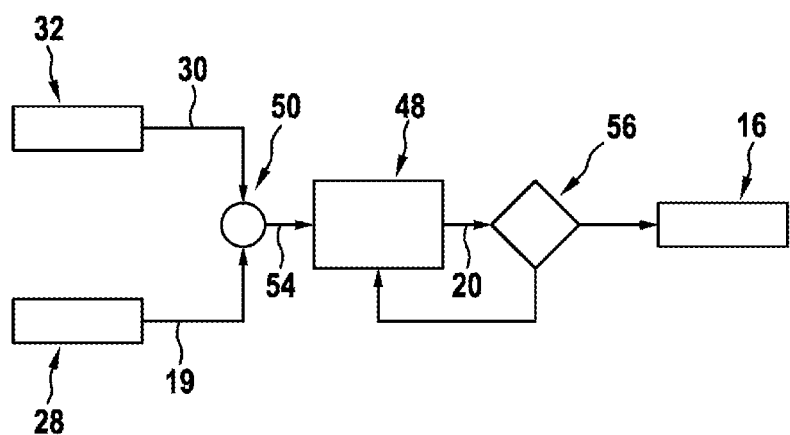

For this reason, in particular with reference to FIGS. 2 and 3, a method is described for controlling a steering angle of at least one steerable vehicle wheel 10 of the vehicle 12, in particular in the form of a front wheel. In this case, a computing unit 36 is provided to execute the method for controlling the wheel steering angle and has in particular a computer program with corresponding program code means.

In the present case, according to the disclosure, in order to avoid a wheel steering angle change of the vehicle wheel 10 when the vehicle 12 is at a standstill, in at least one operating state in which the vehicle 12 is at a standstill and a steering demand 18, 19 is received, the wheel steering angle of the vehicle wheel 10 is kept at least substantially constant and preferably completely constant and a target wheel steering angle 20 for the vehicle wheel 10 is determined depending on the steering demand 18, 19. In order to determine the target wheel steering angle 20, a steering demand 18, 19 correlated with the target trajectory is determined for a driving process of the vehicle 12, in particular a start-up process, a maneuvering process and/or a parking process, and the target wheel steering angle 20 is determined depending on the target trajectory, in particular in such a way that a change of the wheel steering angle of the vehicle wheel 10 with the vehicle 12 at a standstill is avoided. For this purpose, the computing unit 36 comprises at least one planning function 48 with a planning routine for determining the target trajectory correlated with the steering demand 18, 19.

Subsequently, in at least one further operating state at a time after the operating state, in which the vehicle 12 is moving, the wheel steering angle is adjusted to the target wheel steering angle 20 by means of the wheel steering angle controller 16. The wheel steering angle is adjusted to the target wheel steering angle 20 by means of the wheel steering angle controller 16 as soon as the vehicle 12 starts to move, advantageously at the latest 0.2 s after starting the vehicle 12 moving and/or at the latest when reaching a vehicle speed of 1 km/h.

FIG. 2 shows a first exemplary signal flow diagram for a first use case of the method described above. In this use case, it is a manual driving mode of the vehicle 12.

During this, an offsetting function 50 of the computing unit 36 is supplied with a manual steering demand 18 from the steering input unit 22. In addition, the offsetting function 50 is supplied with the sensor system parameter from the vehicle sensor system 32 and the driver's input 34 from the driver's input unit 52, which differs from the manual steering demand 18. By means of the offsetting function 50, the steering demand 18, the sensor system parameter 30 and the driver's input 34 are offset against each other and fed to the planning function 48 as an input variable 54. Alternatively, however, it is also conceivable to integrate an offsetting function into a planning function and/or to completely dispense with an offsetting function and to feed a steering demand, a sensor system parameter and/or a driver's input directly to a planning function of a computing unit. Furthermore, it is also conceivable in principle to completely dispense with the delivery of a sensor system parameter and/or an additional driver's input.

The planning function 48 then determines, on the basis of the input variable 54 and therefore in particular of the steering demand 18, the sensor system parameter 30 and the driver's input 34, a target trajectory correlated with the steering demand 18, on the basis of which a target wheel steering angle 20 for the vehicle wheel 10 is determined. Consequently, in the present case, the sensor parameter 30 from the vehicle sensor system 32 and the driver's input 34, which differs from the steering demand 18, are taken into account in the determination of the target wheel steering angle 20, in particular in addition to the steering demand 18. Taking into account the sensor system parameter 30, in particular potential accidents, for example driving against a curb and/or another object, may be prevented in particular by adding a virtual steering angle and/or by limiting a maximum steering angle, while tensioning of the mechanics of the front axle can be monitored by taking into account the driver's input 34 and can be reduced electrically and/or electronically if necessary.

A decision-making function 56 is connected downstream of the planning function 48 for control purposes. The decision-making function 56 is arranged for control purposes between the planning function 48 and the wheel steering angle controller 16. The decision-making function 56 also has an operative connection to the vehicle sensor system 32, in particular to at least one vehicle speed sensor of the vehicle sensor system 32.

In an operating state in which the vehicle 12 is at a standstill, in particular with a vehicle speed of zero, the decision-making function 56 is provided to prevent and/or to block the control of the wheel steering angle controller 16. In a further operating state, in which the vehicle is moving 12, in particular with a non-zero vehicle speed, the decision-maker function 56 is provided to enable control of the wheel steering angle controller 16 and to forward the previously determined target wheel steering angle 20 to the wheel steering angle controller 16, in particular so that the wheel steering angle is adjusted to the target wheel steering angle 20 by means of the wheel steering angle controller 16. In this case, the disclosure therefore uses the mechanical decoupling of the driver and/or the steering input unit 22 from the wheel steering angle controller 16 to ensure that the vehicle 12 is moving before the actual steering of the vehicle wheel 10 and/or the vehicle wheels 10 takes place.

In addition, in the operating state in which the vehicle 12 is at a standstill and the steering demand 18 is received, a realistic steering feel is simulated by means of the steering input actuator 26 and is transmitted in particular to the steering input element 24, whereby a driver can be provided with an advantageously realistic and in particular expected steering feel. In principle, however, such a simulation of a realistic steering feel could also be dispensed with.

FIG. 3 shows a second example of a signal flow diagram for a second use case of the method described above. In this use case, it is an autonomous driving mode of the vehicle 12.

In this application state, a further steering target 19 for changing the wheel steering angle is provided by an autonomously operating assistance function 28 of the computing unit 36. In the present case, the assistance function 28 is, for example, a parking assistant. The further steering demand 19 is then fed to the offsetting function 50 of the computing unit 36 together with the sensor system parameter 30 from the vehicle sensor system 32. By means of the offsetting function 50, the further steering demand 19 and the sensor system parameter 30 are offset against each other and again fed to the planning function 48 as an input variable 54. In this case, however, it is generally conceivable to dispense with the supply of a sensor system parameter.

Subsequently, the planning function 48 determines a target trajectory correlated with the further steering demand 19 on the basis of the input variable 54 and in this case therefore in particular on the basis of the further steering demand 19 and the sensor system parameter 30, on the basis of which a target wheel steering angle 20 for the vehicle wheel 10 is determined. In doing so, the target trajectory which is correlated with the further steering demand 19 is determined for an entire parking process of the vehicle 12 and the target wheel steering angle 20 is determined depending on the target trajectory in such a way that a change in the steering angle of the vehicle wheel 10 with the vehicle 12 at a standstill is avoided during the entire parking process.

Subsequently, the target wheel steering angle 20 determined in this way is again fed to the decision-making function 56, which enables control of the wheel steering angle controller 16 only in a further operating state in which the vehicle is moving 12, in particular with a non-zero vehicle speed, and forwards the previously determined target wheel steering angle 20 to the wheel steering angle controller 16.

The target trajectory can be planned, for example, in such a way that in the case of performing a first parking movement with the vehicle 12 in the rolling state and in particular shortly before a reversal of the direction of the vehicle 12, the vehicle wheel 10 and/or the vehicle wheels 10 is/are moved into a straight ahead position or another planned position for a second parking movement. Alternatively, the target trajectory could also be planned in such a way that the vehicle 12 travels slightly closer to a curb than normally during the first parking movement, in order to compensate for an additional distance which is created by the vehicle 12 starting to move in the second parking movement.

In the present case, it is conceivable in particular that the computing unit 36 is provided to combine the different use cases, in particular the first use case and the second use case, and thus can implement both use cases. Alternatively, however, it is also conceivable to dispense with the first use case or the second use case and thus to store only one of the use cases in the control unit 38.

The invention claimed is:

1. A method of controlling a wheel steering angle of at least one vehicle wheel of a vehicle, the vehicle including a steer-by-wire steering system with at least one wheel steering angle controller for changing the wheel steering angle of the at least one vehicle wheel depending on a steering demand, the method comprising:
in at least one operating state, in which the vehicle is at a standstill and the steering demand is received, (i) keeping the wheel steering angle constant, and (ii) determining a target wheel steering angle for the at least one vehicle wheel depending on the steering demand; and
in at least one further operating state following the at least one operating state, in which the vehicle is moving and the steering demand is the same as the steering demand in the at least one operating state, adjusting the wheel steering angle to the target wheel steering angle using the at least one wheel steering angle controller.

2. The method according to claim 1, further comprising:
adjusting the wheel steering angle to the target wheel steering angle as soon as the vehicle starts to move.

3. The method according to claim 1, further comprising:
determining, in the at least one operating state, a target trajectory for a driving process of the vehicle correlated with the steering demand; and
determining the target wheel steering angle depending on the target trajectory.

4. The method according to claim 1, wherein the steer-by-wire steering system has at least one steering input unit with at least one steering input element for manual input of the steering demand.

5. The method according to claim 4, wherein:
the at least one steering input unit comprises a steering input actuator configured to generate a steering resistance and/or a restoring torque on the at least one steering input element, and
in the at least one operating state, a realistic steering feel is simulated by the steering input actuator without movement of the at least one vehicle wheel.

6. The method according to claim 1, further comprising:
providing the steering demand in at least one application state by an autonomously operating assistance function.

7. The method according to claim 6, wherein:
the assistance function is a parking assistant, and
in the at least one operating state, a target trajectory correlated with the steering demand is determined for an entire parking process of the vehicle and the target wheel steering angle is determined such that a change of the wheel steering angle of the vehicle wheel in the at least one operating state is avoided during the entire parking process.

8. The method according to claim 1, further comprising:
taking into account at least one sensor system parameter of a vehicle sensor system in the determination of the target wheel steering angle.

9. The method according to claim 1, further comprising:
taking into account at least one driver's input including an actuation of an accelerator pedal and/or a brake pedal, which is different from the steering demand in the determination of the target wheel steering angle.

10. A vehicle comprising:
at least one vehicle wheel;
a steer-by-wire steering system including at least one wheel steering angle controller configured to change a wheel steering angle of the at least one vehicle wheel depending on a steering demand; and
an offsetting unit configured to control the wheel steering angle of the at least one vehicle wheel, the offsetting unit configured,
in at least one operating state, in which the vehicle is at a standstill and the steering demand is received, (i) to keep the wheel steering angle constant, and (ii) to determine a target wheel steering angle for the at least one vehicle wheel depending on the steering demand; and
in at least one further operating state following the at least one operating state, in which the vehicle is moving and the steering demand is the same as the steering demand in the at least one operating state, to adjust the wheel steering angle to the target wheel steering angle using the wheel steering angle controller.

11. The method according to claim 1, wherein a control unit is configured to carry out the method.

* * * * *